United States Patent
Pfusterschmid et al.

(10) Patent No.: US 6,880,656 B2
(45) Date of Patent: Apr. 19, 2005

(54) COOLER ARRANGEMENT FOR AGRICULTURAL IMPLEMENTS

(75) Inventors: Johann Pfusterschmid, Ernsthofen (AT); Robert Haller, Ernsthofen (AT)

(73) Assignee: CNH America LLC, New Holland, PA (US)

( * ) Notice: Subject to any disclaimer, the term of this patent is extended or adjusted under 35 U.S.C. 154(b) by 114 days.

(21) Appl. No.: 10/348,402

(22) Filed: Jan. 21, 2003

(65) Prior Publication Data

US 2003/0168269 A1 Sep. 11, 2003

(30) Foreign Application Priority Data

Feb. 16, 2002 (DE) .......................................... 102 06 551

(51) Int. Cl.[7] .............................................. B60K 11/04
(52) U.S. Cl. ...................... 180/68.4; 165/41; 123/41.43
(58) Field of Search ............................... 180/68.1, 68.2, 180/68.3, 68.4, 68.6; 165/41, 42, 43, 44, 51, 52, 77, 78, 86; 123/41.43, 41.51

(56) References Cited

U.S. PATENT DOCUMENTS

| | | | | |
|---|---|---|---|---|
| 3,334,704 A | * | 8/1967 | Gehrke et al. ............. | 180/68.4 |
| 4,696,361 A | * | 9/1987 | Clark et al. ................ | 180/68.4 |
| 5,234,051 A | * | 8/1993 | Weizenburger et al. ....... | 165/41 |
| 5,386,873 A | * | 2/1995 | Harden et al. ................ | 165/47 |
| 5,492,167 A | * | 2/1996 | Glesmann ..................... | 165/41 |
| 5,816,350 A | * | 10/1998 | Akira et al. ............... | 180/68.1 |
| 6,024,164 A | * | 2/2000 | Sorbel .......................... | 165/41 |
| 6,105,660 A | * | 8/2000 | Knurr .......................... | 165/41 |
| 6,435,264 B1 | * | 8/2002 | Konno et al. ................. | 165/41 |

* cited by examiner

Primary Examiner—Christopher P. Ellis
Assistant Examiner—Christopher Bottorff
(74) Attorney, Agent, or Firm—Collin A. Webb; John William Stader

(57) ABSTRACT

A cooler arrangement for agricultural implements, particularly for tractors is quickly and easily moved to permit access thereto for cleaning. The cooler block contains at least a front cooler, a central cooler, and a rear cooler. The rear cooler is attached at a fixed position on the frame of the agricultural tractor and the central cooler can be moved away from the rear cooler while the front cooler can also be moved away from the central cooler. The front cooler is suspended so that is can move sufficiently upwardly and, if necessary, also forwardly, that the central cooler can be swung away from the rear cooler unhindered to the side at about a right angle. The front cooler is joined to a tilting mechanism having a lever arm pointing in the direction of travel of the tractor.

4 Claims, 10 Drawing Sheets

COOLER ARRANGEMENT FOR AGRICULTURAL IMPLEMENTS

BACKGROUND OF THE INVENTION

The present invention relates a cooler arrangement for agricultural implements, especially for tractors and, more particularly, to a front cooler is suspended so that is can move away from the rear cooler.

The cooler arrangement in powerful tractors is mostly laid out today, viewed in the direction of travel, so that the oil cooler is located in front of the water cooler and immediately in front of the oil cooler the inlet intercooler is located, if the cooling fan is arranged behind the water cooler. The air inlet and outlet areas of these coolers are of equal size, so that the cooling fan sucks a uniform stream of cooling air through all the coolers in the cited sequence. The cooler block thus constructed is located in the case of tractors behind the air inlet opening of the cooler hood, which for the purpose of maintenance and repairs can be swivelled upwards.

Since agricultural implements are known to be found frequently in an environment with considerable air pollution, its coolers must be cleaned from time to time. This takes place usually by blowing air or a liquid through them against the direction of the flow of cooling air in normal operation. For this the coolers must be spaced out so far from each other that they are accessible from the rear. However, for agricultural implements this is not so easy to put into practice, as the space necessary for this type of arrangement is severely restricted by the wheels and the frame as well as the front lifting gear and possibly necessary ballast weights, so that always a part of the area to be cleaned remains inaccessible.

A variant embodiment of a cooler arrangement in tractors with a facility for cleaning consists of an inlet intercooler, an air conditioning cooler, an oil cooler and a water cooler, which is arranged in this sequence viewed in the direction of flow of the cooling air. The inlet intercooler and the water cooler are attached firmly to the frame of the tractor, and of the remaining coolers, at least two of them, are installed so that they can be withdrawn to the side. A disadvantage with this arrangement of coolers is that removal of the said coolers is relatively time-consuming. By the incorporation of these coolers in guides for withdrawal towards the sides this procedure also requires physical effort as these guides are heavily soiled with the passage of time. Furthermore, the coolers cannot be cleaned correctly, since the space for pulling them out to the side completely is simply not available.

A second variant embodiment of an arrangement of coolers on a tractor has been exhibited by the German firm "Fendt" at "Agritechnika 2001", in which viewed in the direct of flow of the cooling air, the sequence consists of an oil cooler, and inlet intercooler and a water cooler. Here the oil cooler is fixed to the front on the frame of the inlet intercooler, viewed in the direction of travel, where it is suspended so that it can pivot by about 90 degrees to the front about a vertical axis on the side of the turbo inlet intercooler and thus it can swing away from the inlet intercooler. The inlet intercooler formed as a casing open towards the front is arranged directly in front of the water cooler. It is held in pivoting points above in the frame of the tractor by means of its two pipes carrying intercooler air, which are rigidly attached to it, so that it can be positioned at an acute angle relative to the water cooler, so that between it and the water cooler a gap expanding from above downwards is formed. In this position the varying pivoting angle between the pipes attached to the engine carrying intercooler air and the aforementioned pipes on the inlet intercooler is compensated for by means of pieces of flexible hose.

With this arrangement of coolers the disadvantage is that through the said narrow gap, the inlet intercooler seen from above downwards can be cleaned with ever more difficulty, so that it does not attain maximum cooling performance. Furthermore, with this arrangement of coolers it is impossible to fix a fourth cooler so that it too would be readily accessible for necessary cleaning.

Therefore, it would be desirable to create an arrangement of coolers for agricultural tractors, whereby good accessibility for at least four coolers arranged in a series one after the other can be guaranteed for their cleaning. The preparation work and the post-cleaning assessment work including the cleaning process itself should preferably require only a small expenditure of time and only a minimal physical effort.

SUMMARY OF THE INVENTION

It is therefore an object of the present invention to provide a cooler arrangement for use on agricultural tractors.

It is a feature of this invention that the front cooler is suspended so that the front cooler can move sufficiently to permit the central cooler to be swung away from the rear cooler.

It is another feature of this invention that the central cooler can be swung away from the rear cooler to be unhindered to the side by about a right angle.

It is an advantage of this invention that the front cooler can be moved upwardly and, if necessary, forwardly relative to the central cooler.

It is another feature of this invention that an air-conditioning cooler is pivotally attached on the front cooler so that the air conditioning cooler can be swung either laterally to the left or to the right of the front cooler about a vertical axis or upwardly or downwardly about a horizontal axis.

It is still another feature of this invention the front cooler is joined to a tilting mechanism.

It is another object of this invention to provide a cooler arrangement for an agricultural tractor having at least a front, a central and a rear cooler attached at a fixed location on the frame of the tractor with the front cooler suspended so that the front cooler can move upwardly until the air inlet surface and the frame of the central cooler are fully exposed.

It is another advantage of this invention that appropriate space is available to provide an improved cooler arrangement on an agricultural tractor wherein the central cooler can be swung away to the side at a right angle unimpeded by the rear cooler It is still another advantage of this invention that all three coolers are so far removed from each other when moved into a cleaning position that a complete cleaning of all the coolers is assured.

It is yet another feature of this invention that the tilting mechanism for the front cooler includes a lever arm pointing in the direction of travel of the agricultural implement with the front end of the lever arm attached rigidly to the upper part of the front cooler and extending in an approximately horizontal direction towards the rear which articulates on a pivoting axle.

It is yet another advantage of this invention that the front cooler is easily released when the central cooler is swung upwardly with the pivoting axle therefor lying slightly above the upper part, so that the central cooler can also swing upwardly as the central cooler is withdrawn forwardly.

It is a further advantage of this invention that both of the pipes conducting charger air and fixed rigidly to the front cooler and also the pipes rigidly fixed to the exhaust gas turbocharger and to the air induction channel of the engine can end at a certain distance in front of the pivoting axle, which permits both ends of each to be connected with a flexible piece of hose.

It is still another object of this invention to provide a cooler arrangement with good accessibility to all of the coolers for the purpose of their complete cleaning, which can be utilized with the presence of four coolers arranged in a series one behind the other.

These and other objects, features and advantages are accomplished according to the instant invention by providing a cooler arrangement for agricultural implements, particularly for tractors that can be quickly and easily moved to permit access thereto for cleaning. The cooler block contains at least a front cooler, a central cooler, and a rear cooler. The rear cooler is attached at a fixed position on the frame of the agricultural tractor and the central cooler can be moved away from the rear cooler while the front cooler can also be moved away from the central cooler. The front cooler is suspended so that is can move sufficiently upwardly and, if necessary, also forwardly, that the central cooler can be swung away from the rear cooler unhindered to the side at about a right angle. The front cooler is joined to a tilting mechanism having a lever arm pointing in the direction of travel of the tractor.

BRIEF DESCRIPTION OF THE DRAWINGS

The advantages of this invention will become apparent upon consideration of the following detailed disclosure of the invention, especially when taken in conjunction with the accompanying drawings, wherein.

DETAILED DESCRIPTION OF THE PREFERRED EMBODIMENT

Figure 1:
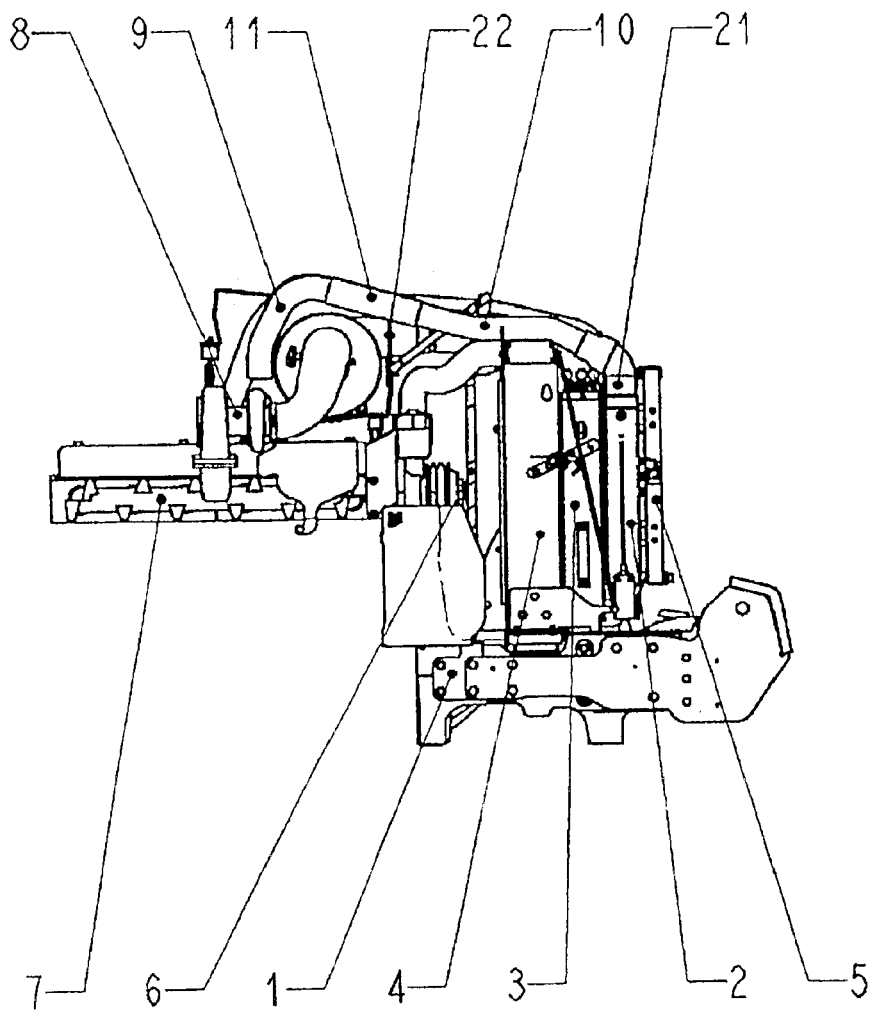
FIG. 1 is a diagrammatic right side elevational view of the front part of a tractor with a cooler incorporating the principles of the instant invention shown in the operating position.
Figure 12:
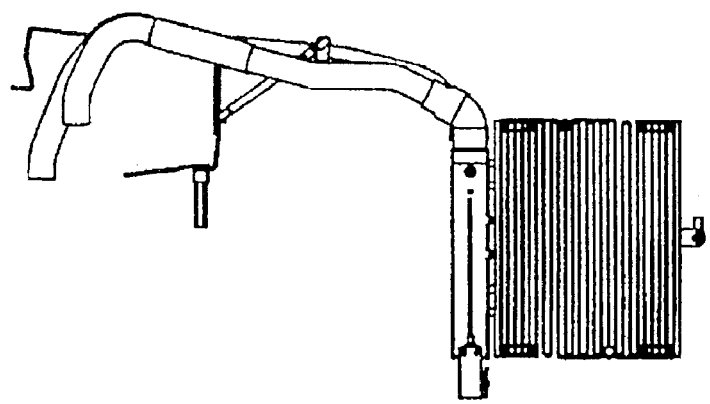
FIG. 12 is a detail view similar to that of FIG. 10 with the air-conditioning cooler swung forwardly.
Figure 13:
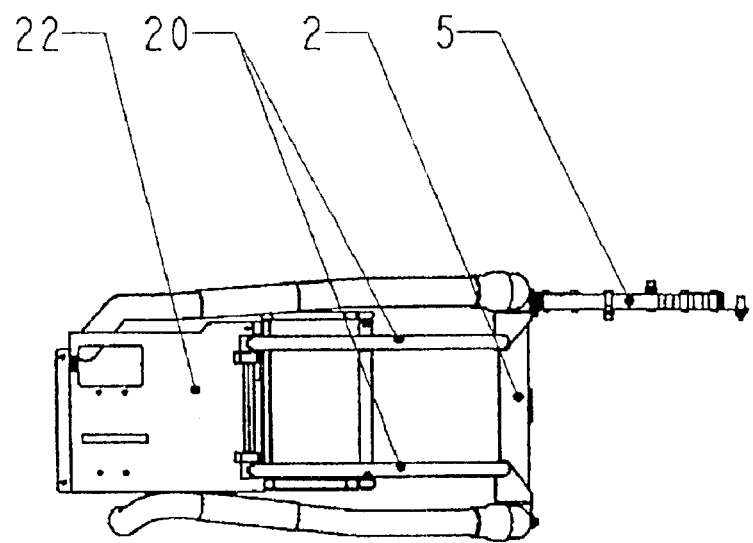
FIG. 13 is a top plan view of tractor depicted in FIG. 12.

Referring to the drawings and particularly to FIG. 1, a schematic side view of a tractor from the right hand side as seen in the direction of travel shows the frame (1) on which the cooler arrangement is built. The cooler arrangement consists of a front cooler (2) designed as an inlet intercooler, a central cooler (3) designed as an oil cooler and a rear cooler (4) designed as a water cooler. On the front cooler (2) in addition a narrow air-conditioning cooler (5) is fixed on pivots, so that it can be swung sideways either to the left or to the right about a vertical axis as depicted in FIGS. 12 and 13, or about a horizontal axis upwards or downwards from this. A cooling fan (6) sucks a uniform stream of air through all the coolers (2), (3), (4) and (5) and is located behind the water cooler to be driven in a known manner from the engine (7) of the tractor. From this side also, the exhaust gas turbocharger (8) can be seen, to which a pipe (9) carrying charger air projecting upwards and forwards is rigidly attached, which is connected by a flexible hose piece (11) to the pipe (10) carrying charger air, which is rigidly attached to the inlet intercooler.

Figure 2:
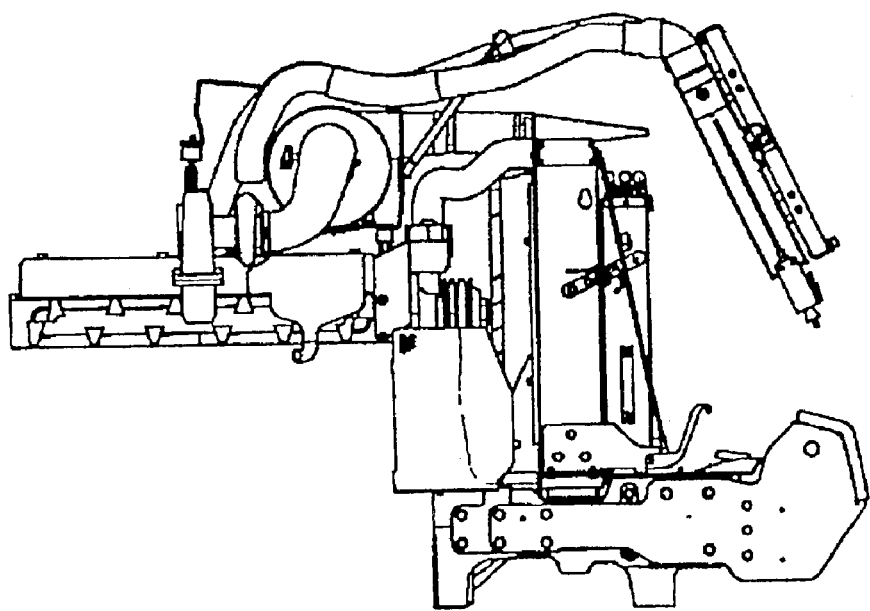
FIG. 2 is a side elevational view similar to that of FIG. 1, but with the front cooler half raised.
Figure 3:
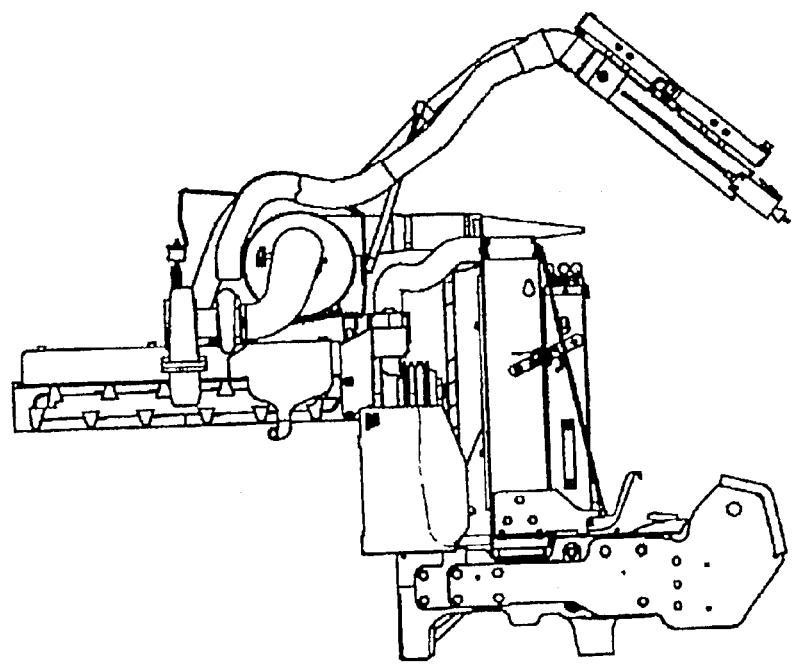
FIG. 3 is a side elevational view similar to that of FIG. 2, but with the front cooler fully raised.
Figure 4:
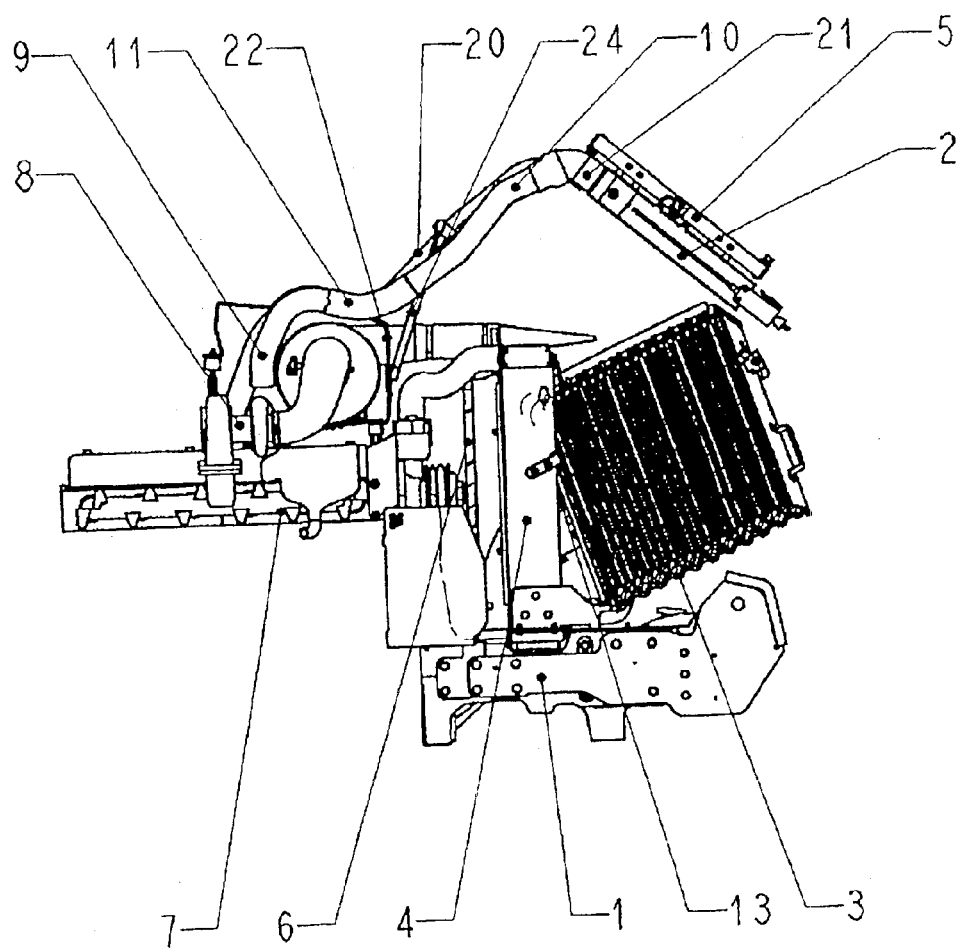
FIG. 4 is a right side elevational view similar to that of FIG. 1 depicting the central cooler swung out.
Figure 5:
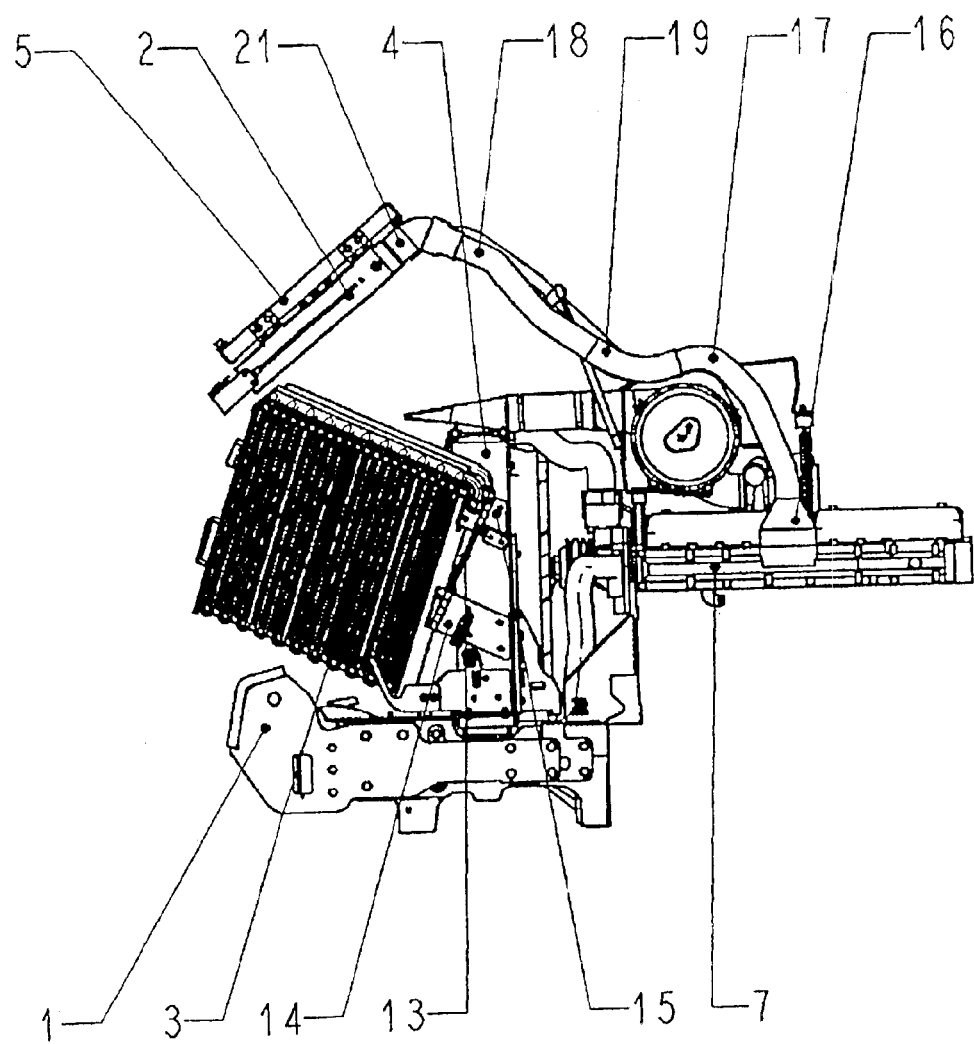
FIG. 5 is a left side elevational view of the tractor of FIG. 4.
Figure 6:
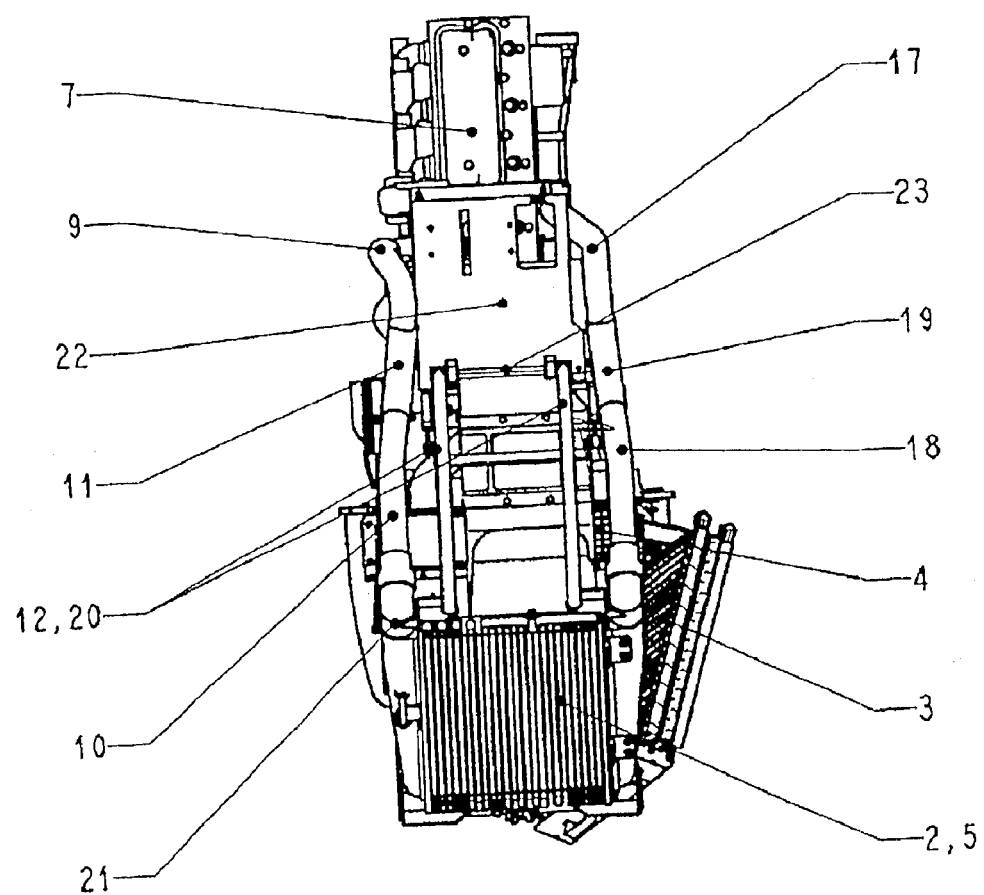
FIG. 6 is a top plan view of the tractor depicted in FIG. 5.
Figure 7:
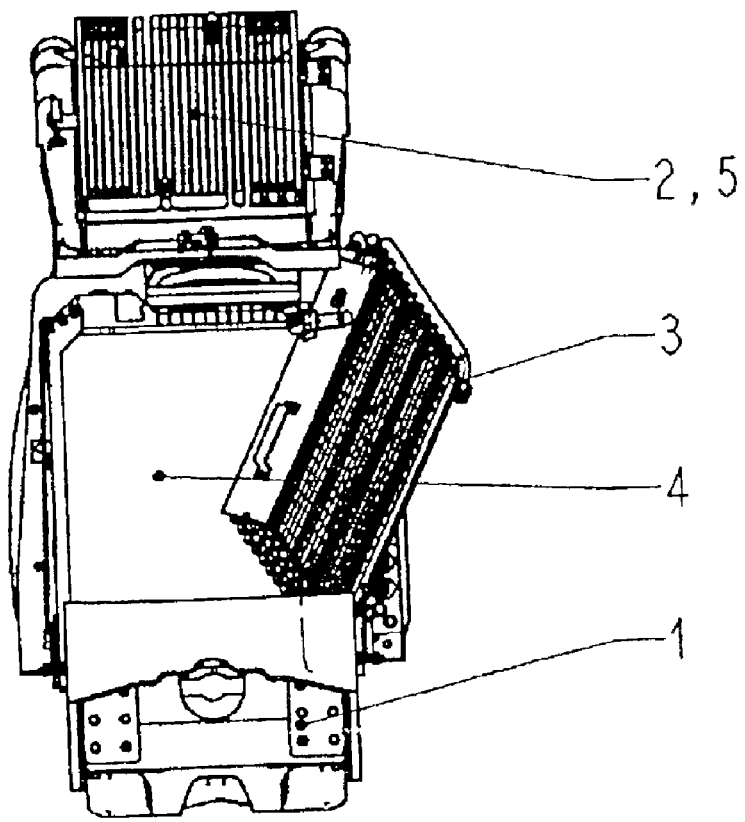
FIG. 7 is a front elevational view of the tractor depicted in FIGS. 5 and 6.
Figure 8:
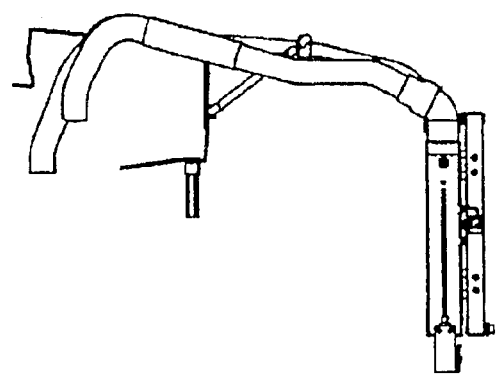
FIG. 8 is a detail view of the front cooler in the operating position depicting the swinging mechanism and the pipes conveying the charger air.
Figure 9:
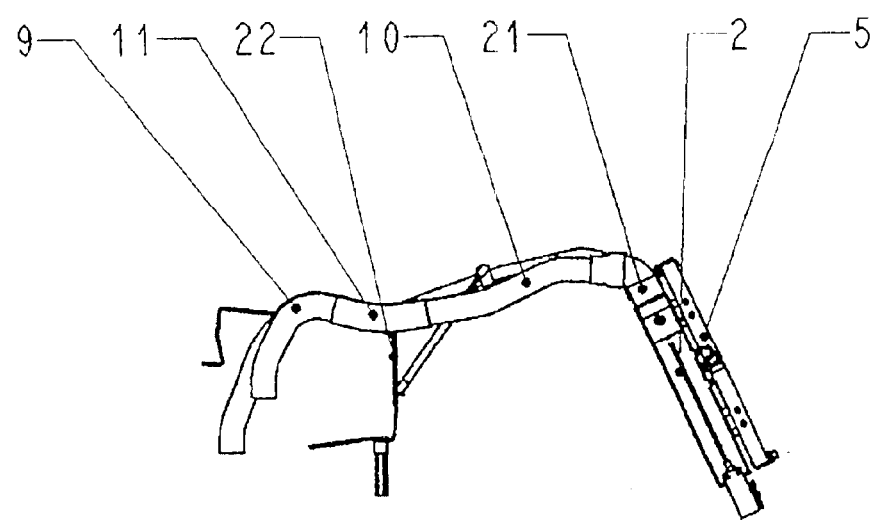
FIG. 9 is a detail view similar to that of FIG. 8 but with the front cooler raised somewhat.
Figure 10:
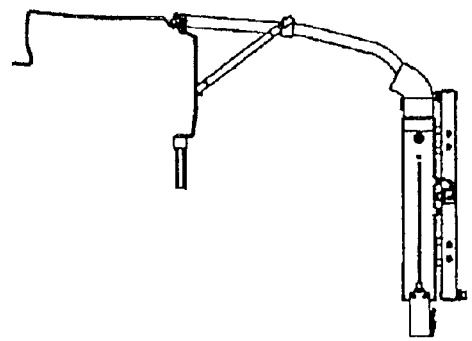
FIG. 10 is a detail view similar to that of FIG. 8 depicting only the swinging mechanism.
Figure 11:
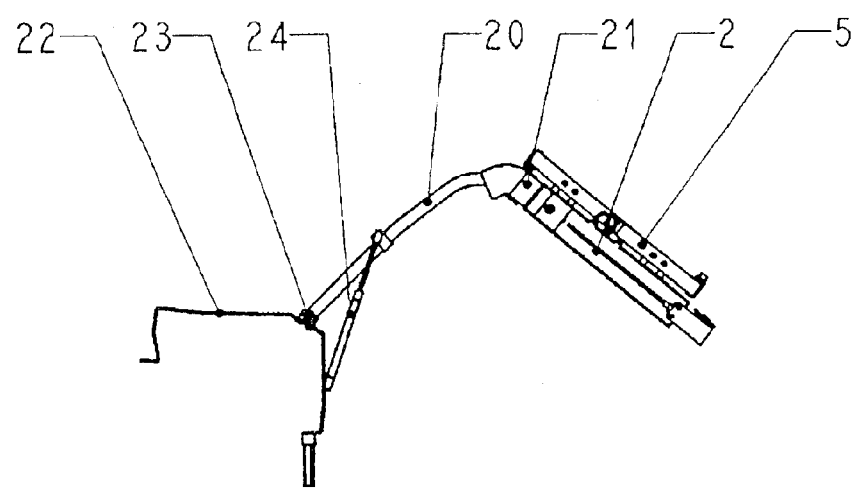
FIG. 11 is a detail view similar to that of FIG. 9 depicting the movement of the swinging mechanism.

The following FIGS. 2 and 3 show the swinging up of the inlet intercooler through a central to the uppermost position, which is achieved with a tilting mechanism (12) to be explained in greater detail below. As shown in FIGS. 4 through 7, the inlet intercooler is swung upwards to the maximum, the oil cooler is swung away towards the front by approximately 90 degrees. The oil cooler, which articulates on a hinge axis (13) attached to the water cooler, stands in the space at an acute angle inclined forwards and downwards in relation to an intended vertical axis. According to FIG. 5, this arrangement is achieved relatively simply with hinges (14) and (15) of differing length. FIG. 5 also shows analogously how on the right hand side the pipe (17), rigidly fixed to the charger air induction channel and carrying charger air, is connected also on this side by means of a flexible piece of hose (19) to the pipe (18) carrying charger air, which is rigidly fixed to the inlet intercooler.

The aforementioned tilting mechanism (12) for the inlet intercooler consists on the one hand of a lever arm (20) pointing in the direction of travel of the tractor and having at least the vertical length of the inlet intercooler. With its front end it is rigidly attached to the upper part (21) of the inlet intercooler and it extends from there in an approximately horizontal direction to the rear up to a console (22) attached at a fixed position on the frame (1) or on the engine (7). There the lever arm (20) is taken up in a pivoting axle (23), which is situated at least at the same height as the upper part (21) of the inlet intercooler. Finally a gas spring (24), which is joined at one end to the console (22) and at the other end articulates with the lever arm (20), forms part of the tilting mechanism (12). Regarding the position of the flexible hose pieces (11) and (19), it is significant that these, observed from the side, are coincident with their centre to the pivoting axle (23).

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other

Having thus described the invention, what is claimed is:

1. In a tractor having a frame and a cooler arrangement supported on said frame at a forward end thereof to dissipate heat generated during the operation of the tractor, the cooler arrangement including a front cooler inlet cooler, a central oil cooler, and a rear water cooler, said rear cooler being attached at a fixed position on said frame and the central cooler being movable relative to the rear cooler, the front cooler being mounted for movement relative to said central cooler, the improvement comprising:

the front cooler is suspended so that it can move upwardly and selectively forwardly to permit the central cooler to be swung away from the rear cooler unhindered to the side of said rear cooler at approximately right angles thereto; and an air-conditioning cooler is pivotally attached to said front cooler so that said air-conditioning cooler can be swung either laterally to the left or to the right of said front cooler about a vertical axis or moved upwardly or downwardly about a horizontal axis.

2. The tractor of claim 1 wherein the front cooler is joined to a tilting mechanism including a lever arm pointing in the direction of travel of the tractor and having at least the vertical height of the front cooler, said lever arm having a front end being attached rigidly to an upper part of the front cooler, which extends in approximately a horizontal direction rearwardly to a console situated at a fixed position on the tractor, said lever having a rear end formed with a pivot axis which is positioned at substantially the same height as the upper part of the front cooler.

3. The tractor of claim 2 wherein a gas spring is flexibly attached at one end to the console, an opposing end of said gas spring articulates with the lever arm.

4. The tractor of claim 3 further comprising:

an engine supported on said tractor frame to provide a source of operative power for said tractor;

a first pair of pipes carrying charger air and being rigidly attached to the front cooler; and a second pair of pipes carrying charger air and being rigidly attached to a an exhaust gas turbocharger for said engine and to an air induction channel of said engine;

said first and second pairs of pipes end of the console at a certain distance in front of the pivot axis, said first and second pairs of pipes being joined to each other with a flexible hose piece.

* * * * *